(12) United States Patent
Archambault et al.

(10) Patent No.: US 6,795,607 B1
(45) Date of Patent: Sep. 21, 2004

(54) USE OF TUNABLE LASER FOR OPTICAL PERFORMANCE MONITORING IN WDM SYSTEM

(75) Inventors: Jean Luc Archambault, Severna Park, MD (US); Vipul Bhatnagar, Kensington, MD (US); Michael Y. Frankel, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 22 days.

(21) Appl. No.: 09/975,728

(22) Filed: Oct. 11, 2001

Related U.S. Application Data

(60) Provisional application No. 60/239,562, filed on Oct. 11, 2000.

(51) Int. Cl.[7] .................................................. G02B 6/28
(52) U.S. Cl. .......................................... 385/24; 398/91
(58) Field of Search ............................. 385/24, 37, 39; 359/134, 130, 179, 341, 124–125, 177, 344; 398/91

(56) References Cited

U.S. PATENT DOCUMENTS

| | | | | | |
|---|---|---|---|---|---|
| 5,532,864 A | * | 7/1996 | Alexander et al. | .......... | 359/177 |
| 5,627,927 A | * | 5/1997 | Udd | .............. | 385/37 |
| 5,673,129 A | * | 9/1997 | Mizrahi | ....................... | 359/124 |
| 5,696,615 A | * | 12/1997 | Alexander | .................. | 359/134 |
| 5,745,284 A | * | 4/1998 | Goldberg et al. | ........... | 359/344 |
| 5,777,769 A | * | 7/1998 | Coutinho | ..................... | 359/173 |
| 5,784,184 A | * | 7/1998 | Alexander et al. | .......... | 359/125 |
| 5,784,506 A | * | 7/1998 | Pfeiffer | ......................... | 385/24 |
| 5,796,891 A | * | 8/1998 | Poustie et al. | .................. | 385/28 |
| 5,808,762 A | * | 9/1998 | Vanoli et al. | .................. | 398/79 |
| 5,956,166 A | * | 9/1999 | Ogata et al. | ................... | 398/69 |
| 5,995,256 A | * | 11/1999 | Fee | .............................. | 398/34 |
| 6,134,253 A | * | 10/2000 | Munks et al. | .................. | 372/32 |
| 6,160,931 A | * | 12/2000 | Asakura | ....................... | 385/24 |
| 6,377,730 B1 | * | 4/2002 | Bergmann et al. | ............. | 385/39 |
| 6,388,782 B1 | * | 5/2002 | Stephens et al. | ............. | 359/124 |
| 6,441,933 B1 | * | 8/2002 | Jang | ............................. | 398/79 |
| 6,498,871 B1 | * | 12/2002 | Kuboki | ......................... | 385/24 |
| 6,504,976 B1 | * | 1/2003 | Polynkin et al. | .............. | 385/37 |
| 6,630,992 B1 | * | 10/2003 | Vobian et al. | .............. | 356/73.1 |
| 6,661,974 B1 | * | 12/2003 | Ooi et al. | ...................... | 398/95 |

* cited by examiner

*Primary Examiner*—Ellen E. Kim
(74) *Attorney, Agent, or Firm*—Michael R. Cammarata; David L. Soltz

(57) ABSTRACT

Consistent with the present invention, a tunable laser emits a monitoring signal which is combined with the WDM channels typically at the transmit side of a WDM system. At each monitoring point along the WDM system, the WDM channels are filtered out, the monitoring signal is sensed, and desired systems parameters (e.g., gain flatness, dispersion, PMD and OSNR) are measured. Accordingly, a single tunable element, i.e., the tunable laser, can be provided, thereby reducing costs. Moreover, system performance can be ascertained regardless of whether WDM channels are present.

29 Claims, 6 Drawing Sheets

USE OF TUNABLE LASER FOR OPTICAL PERFORMANCE MONITORING IN WDM SYSTEM

CROSS REFERENCE TO RELATED APPLICATION

The present application claims the benefit of the filing date of U.S. Provisional Application No. 60/239,562, filed Oct. 11, 2000, the teachings of which are incorporated herein by reference.

FIELD OF THE INVENTION

The present invention relates to wavelength division multiplexed (WDM) optical communication systems, in particular, such systems having a tunable laser for performance monitoring.

BACKGROUND OF THE INVENTION

WDM optical communication systems have been deployed to increase the capacity of existing fiber optic networks. These systems typically include a plurality of transmitters, each including a semiconductor laser diode respectively transmitting signals on a designated one of a plurality of channels or wavelengths. The channels are combined by a multiplexer at one end terminal and transmitted on a single fiber to a demultiplexer at another end terminal where they are separated and supplied to respective receivers. Several parameters, discussed below, effect WDM system performance and should therefore be monitored.

I. Amplifier Gain Flatness

Typically, a plurality of erbium doped fiber amplifiers are provided at nodes spaced along the fiber between the multiplexer and demultiplexer in order to regenerate each channel within the WDM signal. However, erbium doped fiber amplifiers often do not uniformly amplify light across each WDM channel, typically within the spectral region of 1525 to 1570 nm. For example, an optical channel at a wavelength of 1540 nm may be amplified as much as 4 dB more than an optical channel at a wavelength of 1555 nm. While such a large variation in gain can be tolerated for a system with only one optical amplifier, it cannot be tolerated for a system with plural optical amplifiers or numerous, narrowly spaced optical channels. In these environments, much of the amplifier pump power supplies energy for amplifying light at the high gain wavelengths rather than amplifying the low gain wavelengths. As a result, low gain wavelengths can suffer excessive noise accumulation after propagating through several amplifiers.

II. Chromatic Dispersion

Another factor effecting WDM system performance relates to chromatic dispersion. Optical signals transmitted in a fiber optic communication system typically constitute a series of pulses of digital information. Although the pulses are usually at a single nominal wavelength, each pulse is actually composed different spectral components. These spectral components propagate through the transmission fiber at different speeds, which has the effect of broadening the pulse as it propagates through the fiber. This effect, known as "chromatic dispersion", can result in spectral components of one pulse arriving at a receiver at substantially the same time as a succeeding pulse, thereby causing degraded receiver sensitivity. Dispersion compensated fiber, commercially available from Corning, for example, can be used to offset chromatic dispersion, but its effectiveness over a wide range of wavelengths found in high channel count WDM systems can be limited. Accordingly, due to the wavelength dependence on dispersion, certain WDM channels may be adequately dispersion compensated while others are not.

III. Polarization Mode Dispersion (PMD)

Each optical pulse can further include light of different polarizations in addition to different spectral components. These various polarizations can also propagate at different speeds in the transmission fiber, so that adjacent pulses can bleed into one another making it difficult to accurately detect each pulse.

Each of these effects, as well as others, can reduce system performance, often gauged by measuring an optical signal-to-noise ratio (OSNR) for each channel in the WDM system. Conventional monitoring techniques for measuring OSNR, as well as the above-identified parameters, have implemented a tunable filter at various monitoring points along a WDM system. The tunable filter individually selects each channel of the WDM system, and using well-known methodologies and techniques, gain flatness and OSNR can be measured. Tunable filters, however, are expensive, and the cost for deploying large numbers in a WDM system traversing many hundreds of kilometers can be prohibitive.

Alternatively, subcarrier modulation techniques can be employed in which a unique subcarrier is applied to each WDM channel, thereby allowing each channel to be diagnosed individually through electronic filtering. This approach, however, requires that each WDM channel be present. If no channels are present, the system cannot be monitored.

SUMMARY OF THE INVENTION

Consistent with the present invention, an optical device is provided having a first a first optical transmitter emitting a first optical signal having a first wavelength, and a second optical transmitter emitting a second optical signal having a second wavelength different than the first wavelength. The second wavelength is variable among a plurality of wavelengths. An optical combining element is further provided which is configured to combine the first and second optical signals onto a common optical communication path. In addition, an optical filtering element is coupled to the optical communication path having an associated transmission spectrum with a plurality of transmission peaks, each of which corresponding to a respective one of said plurality of wavelengths. A receiver circuit is also provided which is coupled to the optical filtering element, said receiver circuit is configured to sense the second optical signal.

In alternative embodiments, the optical filtering elements may be omitted if the second wavelength is varied in a step-wise fashion to avoid any overlap with the first wavelength or if its optical power is sufficiently low, so that it does not interfere significantly with the first wavelength.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Consistent with the present invention, a tunable laser emits a monitoring signal which is combined with the WDM channels typically at the transmit side of a WDM system. At each monitoring point along the WDM system, the WDM channels are filtered out, the monitoring signal is sensed, and desired systems parameters (e.g., gain flatness, dispersion, PMD and OSNR) are measured. Accordingly, a single tunable element, i.e., the tunable laser, can be provided, thereby reducing costs. Moreover, system performance can be ascertained regardless of whether WDM channels are present In order to assure that the monitoring signal does not interfere with the WDM channels, the monitoring signal can be supplied to a filter, such as a Fabry-Perot etalon, having a transmission spectrum with a plurality of periodically spaced transmission peaks corresponding to the different wavelengths output from the tunable laser. The spectrum of the filter can also have transmission minima between each peak corresponding to the channel wavelengths of the WDM system, to thereby block any monitoring signal light at any one of the WDM channel wavelengths. A similar filter can be provided at each monitoring point to assure that the WDM channels are blocked while substantially only the monitoring signal light is detected. An embodiment in which the wavelength of the monitoring signal light is calibrated is further discussed below.

Alternatively, interference between the monitoring signal and the WDM channels can be suppressed by tuning the monitoring signal in a step-wise fashion rather than continuously, with each wavelength step corresponding to the mid-point between two adjacent WDM channels. Other techniques for minimizing interference include keeping the optical power of the monitoring signal low compared to the WDM channels or modulating the monitoring signal at a high frequency, outside the electrical bandwidth of the WDM channel receivers. These different techniques—optical filtering, step-tuning, power reduction and high-frequency modulation—can be combined or used separately to achieve a sufficiently low amount of signal interference.

Figure 1:
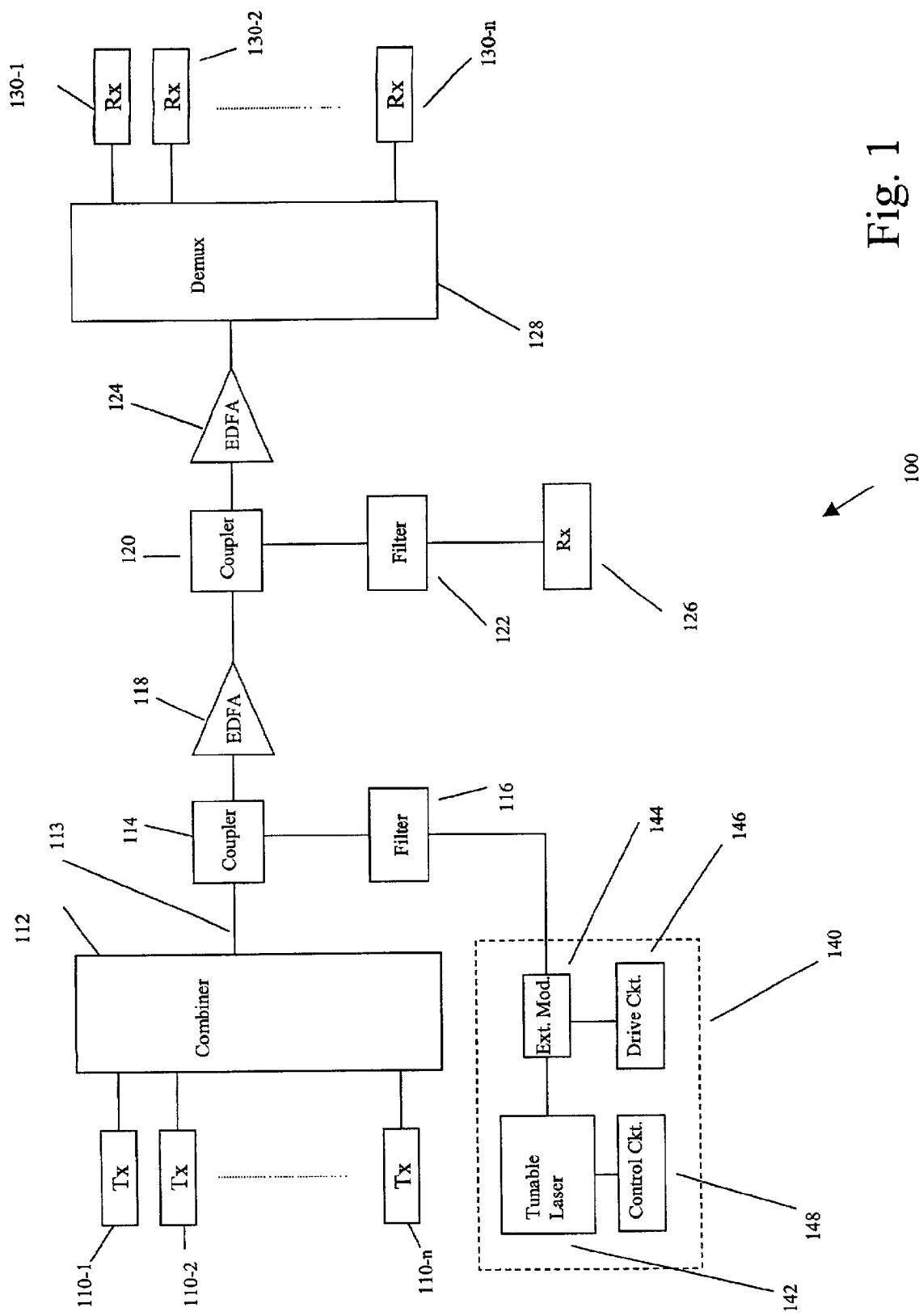
FIG. 1 illustrates a functional block diagram of an optical communication system comprising a tunable laser consistent with a feature of the present invention.

Turning to the drawings in which like reference characters indicate the same or similar elements in each of the several views, FIG. 1 illustrates a WDM system 100 having a plurality of optical transmitters 110-1 to 110-n. Each transmitter emits a respective one of a plurality of optical signals, each of which being at a respective one of a plurality of wavelengths. The optical signals are supplied to a conventional combining element or optical combiner, described for example, in U.S. Pat. No. 5,715,076, incorporated by reference herein, and supplied to an optical communication path, including optical fiber 113. The optical signals propagate through a combining element such as a coupler 114, which combines the optical signals with a monitoring signal at a wavelength different than the optical signals emitted by transmitters 110-1 to 110-n. The optical signals including the monitoring signal are amplified by an optical amplifier such as an erbium-doped fiber amplifier (EDFA) 118 and supplied to coupler 120, which taps a portion of the overall signal including the optical signals originating at transmitters 110-1 to 110-n and the monitoring signal. Filter 122 passes the monitoring signal to receiver 126, but blocks the remaining optical signals. That portion of the overall signal not tapped by coupler 120 is passed to optical demultiplexer 120, which outputs individual optical signals, based on wavelength, to corresponding receiver circuits 130-1 to 130-n.

As further shown in FIG. 1, an additional transmitter 140 may be provided for generating the monitoring signal. Transmitter 140 includes a control circuit 148 that outputs a control signal, such as an electric current, to a conventional tunable laser 142. Light output from tunable laser 142 can vary in accordance with the control signal. Thus, over a specified period of time, light output from laser 142 may be fixed at a wavelength specified by a particular control signal current value, for example, but can change to another wavelength corresponding to another control signal current value.

Light output from tunable laser 142 is next supplied to an external modulator 144, which modulates the light in accordance with the output from a drive circuit 142. Alternatively, tunable laser 142 may be directly modulated. Regardless of the modulation mechanism, the modulated output from transmitter 142 constitutes the monitoring signal. It is noted, however, that the monitoring signal may be unmodulated, in which case neither direct nor external modulation techniques would be employed. The monitoring signal is next typically fed to a filtering element or filter 116, having a spectrum with a plurality of periodically spaced transmission peaks corresponding to the wavelengths of light output from tunable laser 142. Coupler 114 next combines the monitoring signal with the outputs from transmitters 110-1 to 110-n onto the optical communication path. As note above, the monitoring signal can be tapped with coupler 120, passed through filter 122 (having a transmission spectrum substantially the same as that associated with filter 116), and detected at receiver 126.

It should be noted that although a single monitoring signal receiver 126 and two EDFAs are shown in FIG. 1, the present invention is not limited to the specific embodiment shown in FIG. 1. Rather, any suitable number of amplifiers, coupler taps, filters and monitoring signal receivers can be provided. Moreover, it is contemplated that many such components may be provided, as needed, in WDM systems extending over 1000 km or more.

Figure 2:
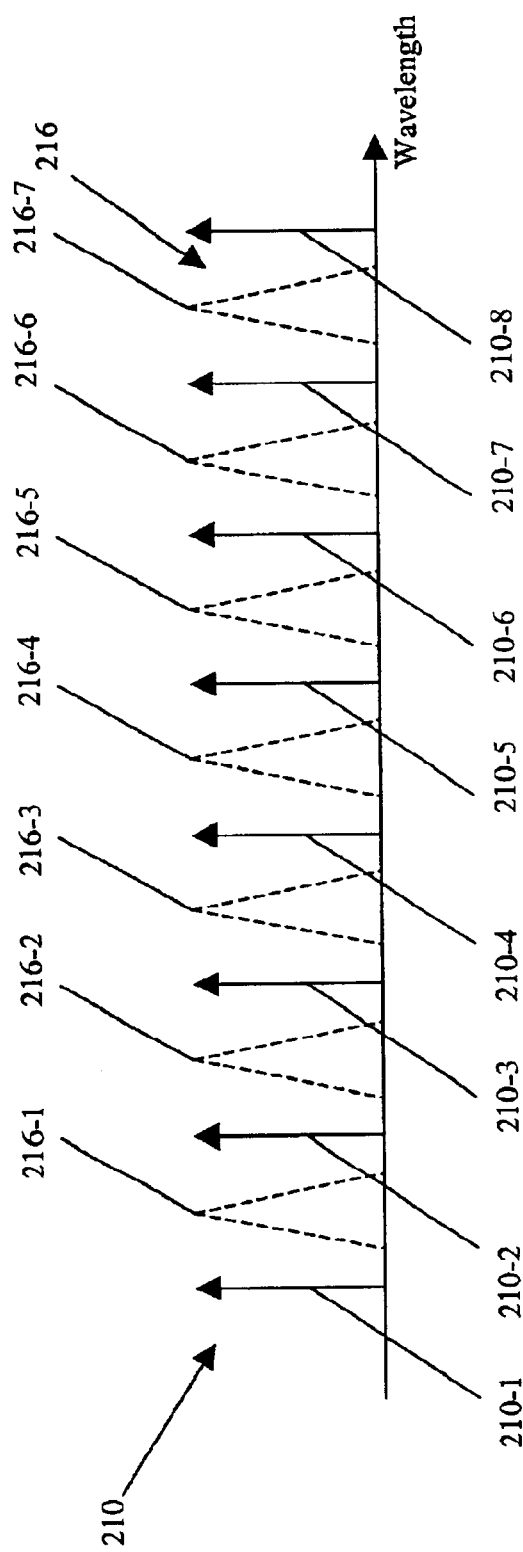
FIG. 2 illustrates a channel plan and transmission spectrum associated with an optical filter consistent with a feature of the present invention.

FIG. 2 illustrates a transmission spectrum 216 associated with filters 116 and 122, typically including a Fabry-Perot etalon. Transmission spectrum 216 includes a plurality of transmission peaks 216-1 to 216-7 at wavelengths corresponding to the various outputs of tunable laser 142. FIG. 2 also shows a channel plan 210 in which the wavelengths (typically in a narrow range about 1550 nm) for various optical signals emitted by transmitters 110 are represented by arrows 210-1 to 210-8. In order to avoid any significant overlap in the output of transmitter 140 and transmitters 110-1 to 110-n, the wavelengths associated with the transmission peaks typically lay between adjacent channel wavelengths in the channel plan. As a result, the monitoring signal does not interfere with the other signals carried by WDM system 100, and downstream from coupler 114, receiver 126 primarily detects the monitoring signal absent any other the remaining optical signals in the system.

Figure 3:
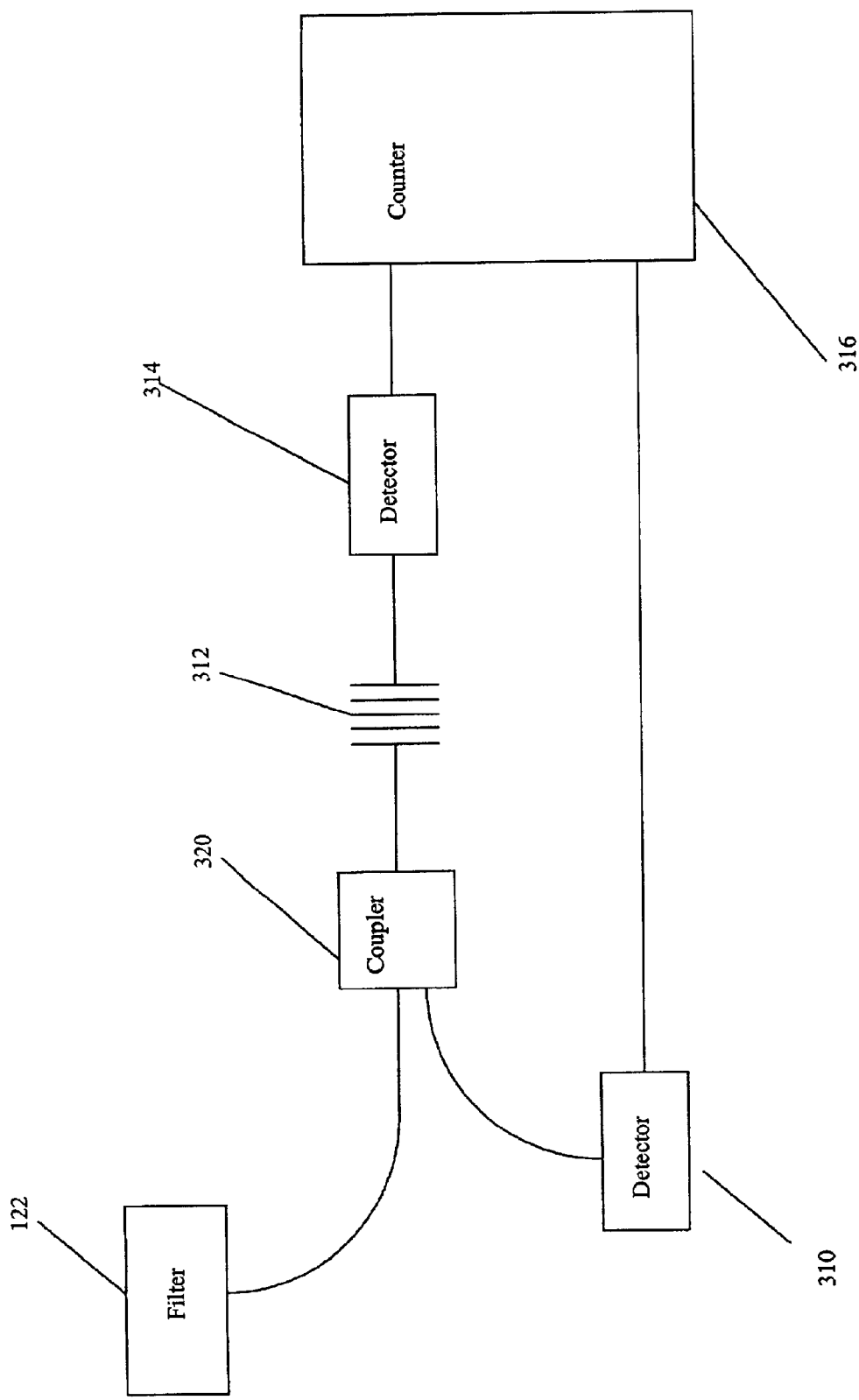
FIG. 3 illustrates an embodiment of the present invention including Bragg grating and a counter circuit.

FIG. 3 illustrates an alternative feature of the present invention including receiver circuitry 300 configured to determine the wavelength of the received monitoring signal. Receiver circuitry 300 includes a coupler 320 which directs light output from filter 122 to an additional filtering element, such as fiber Bragg grating 312. Light at a particular wavelength is reflected by Bragg grating 312 back to coupler 320 and passed to detector 310, including a photodiode or other suitable light-sensing component configured to supply a sense signal to counter circuit 316. Light at other wavelengths, however, passes through Bragg grating 312 to detector 314 (similar to detector 312), which, in turn, is configured to pass a further sense signal to counter circuit 316. The outputs of detectors 312 and 314 can be supplied to a counter circuit 316.

Bragg grating 312 is often configured to reflect light at one of the wavelengths emitted by tunable laser 142, but passes all other wavelengths emitted by laser 142. If the sequence of wavelengths output from laser 142 is known and the first wavelength in the sequence is reflected off of Bragg grating 312, each wavelength output from laser 142 can be determined simply by counting the pulses output from detectors 310 and 314. For example, if Bragg grating 312 reflects light at 1555.5 nm and it is known that tunable laser 142 successively outputs light in 0.8 nm increments beginning at wavelength 1555.5 nm, a light pulse sensed by detector 310 (reflected off of Bragg grating 312) will be assigned 1555.5 nm. The next pulse of light from transmitter 140 will pass though Bragg grating 312, since it is at a wavelength different than 1555.5, and be sensed at detector 314. Counter 316 receives the corresponding sense signal from detector 314, and will assign the next incremental wavelength, namely 1556.3 to that pulse. Successive pulses will be counted and assigned further incremental wavelength values in a similar manner. Accordingly, the wavelength associated with each pulse output from transmitter 140 can be determined.

Figure 4:
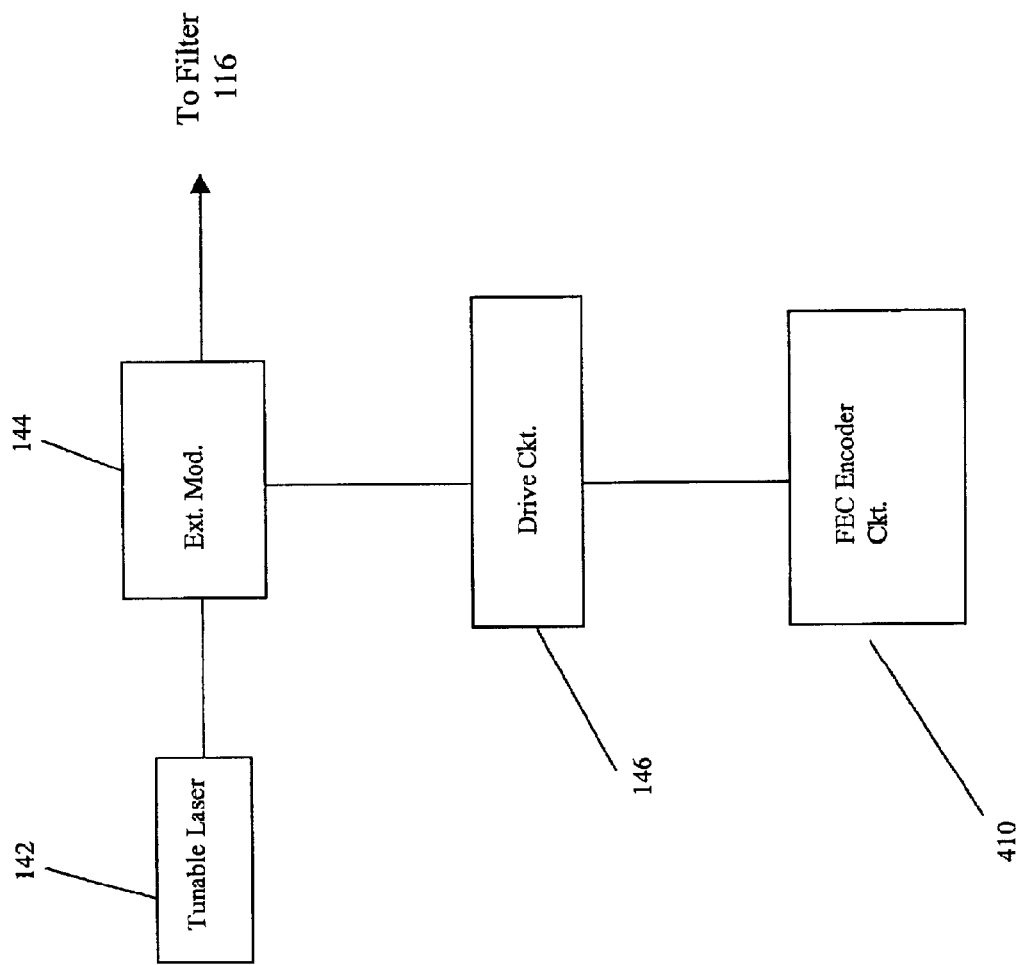
FIGS. 4 and 5 illustrate a further embodiment of the present invention incorporating a forward error correction encoder and decoder circuits, respectively.
Figure 5:
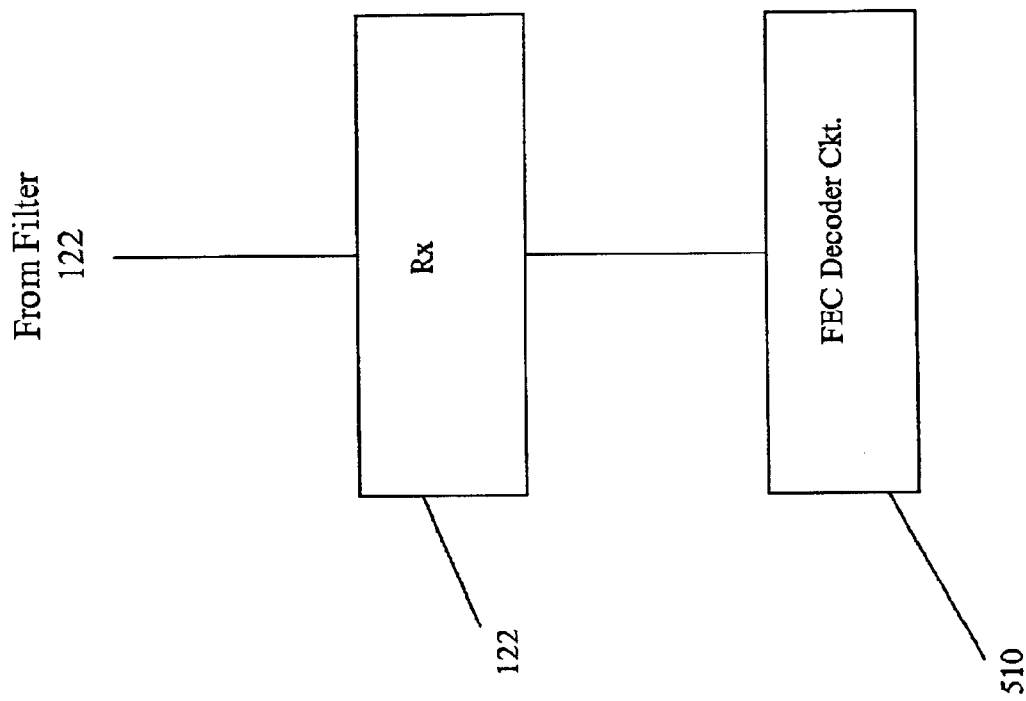

As further shown in FIG. 4, a forward error correction (FEC) encoding circuit 410 can be coupled to driver 146 so that the monitor signal output from transmitter 140 is encoded. In FIG. 5, an FEC decoder circuit 510 can be provided to decode the monitor signal and further discriminate the monitoring signal from the other signals present in WDM system 100. Alternatively, transmitter 140 can be configured to output optical signals having an optical CDMA format.

Figure 6:
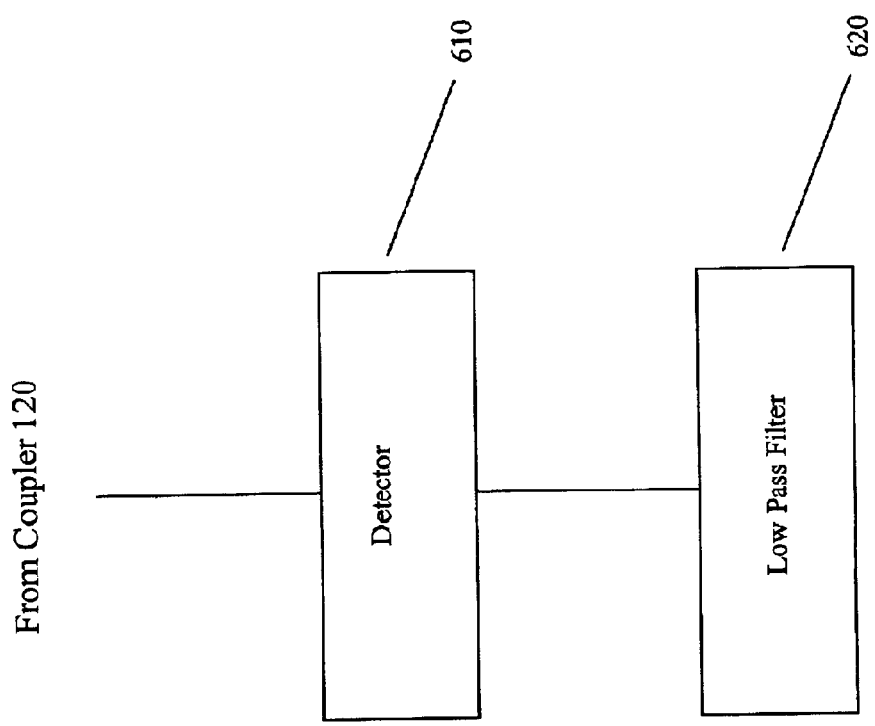
FIG. 6 illustrates receiver circuitry consistent with a further embodiment of the present invention.

In accordance with a further embodiment of the present invention, filter 122 may be omitted, and external modulator 144 modulated at a frequency beyond the radio frequency (RF) bandwidth of the optical signals emitted by transmitters 110-1 to 110-n. As shown in FIG. 6, the monitoring signal and other signals in WDM system 100 are supplied to a detector 610, which outputs an electrical signal to a suitable low pass RF filter 620 to suppress the signal output from transmitters 110-1 to 110-n. Advantageously, modulator 144 could modulate the output from laser 142 at a frequency corresponding to the channel spacing in channel plan 210 shown in FIG. 2. Accordingly, both the carrier optical frequency and the side bands could pass through a period filter simultaneously.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical device, comprising:
   a first optical transmitter emitting a first optical signal having a first wavelength;
   a second optical transmitter emitting a second optical signal having a second wavelength different than said first wavelength, said second wavelength being variable among a plurality of second wavelengths;
   an optical combining element configured to combine said first and second optical signals onto a common optical communication path;
   an optical filtering element coupled to said optical communication path, said optical filtering element having an associated transmission spectrum having a plurality of transmission peaks, each of which corresponding to a respective one of said plurality of second wavelengths; and
   a receiver circuit coupled to said optical filtering element, said receiver circuit being configured to sense said second optical signal.

2. An optical device in accordance with claim 1, wherein said optical filtering element includes a Fabry-Perot etalon.

3. An optical device in accordance with claim 1, wherein said optical combining element includes an optical coupler.

4. An optical device in accordance with claim 1, wherein said optical combining element includes an optical filter.

5. An optical device in accordance with claim 1, wherein said plurality of peaks are periodically spaced within said transmission spectrum.

6. An optical device in accordance with claim 1, wherein said optical filtering element is a first optical filtering element, said optical device further comprising a second optical filtering element coupled to said second optical transmitter and said optical combining element, said second optical filtering element having an associated transmission spectrum substantially the same as said transmission spectrum associated with said first optical filtering element.

7. An optical device in accordance with claim 6, wherein said second optical filtering element includes a Fabry-Perot etalon.

8. An optical device in accordance with claim 1, wherein said combining element is a first combining element, said optical device further comprising:
   a plurality of first optical transmitters, each of which emitting a corresponding one of a plurality of optical signals, each of said plurality of optical signals having a corresponding one of a first plurality of wavelengths, said first optical transmitter being included in said plurality of first optical transmitters and said first optical signal being included in said plurality of optical signals;
   a second combining element having a plurality of inputs, each of which being configured to receive a respective one of said plurality of optical signals, and an output configured to supply said plurality of optical signals onto said optical communication path; and
   an optical demultiplexer coupled to said optical communication path, said optical demultiplexer having an input configured to receive said plurality of optical signals, and a plurality of outputs, each of which being configured to output a respective one of said plurality of optical signals.

9. An optical device in accordance with claim 8, wherein each of said first plurality of wavelengths conforms to a channel plan, each of said second plurality of wavelengths being between adjacent ones of said first plurality of wavelengths in said channel plan.

10. An optical device in accordance with claim 1, further comprising a plurality of optical amplifiers coupled along said optical communication path.

11. An optical device in accordance with claim 10, wherein each of said optical amplifiers includes an erbium doped fiber amplifier.

12. An optical device in accordance with claim 1, wherein said second transmitter includes an external modulator.

13. An optical device in accordance with claim 12, further comprising a plurality of first optical transmitters, each of which emitting a corresponding one of a plurality of first optical signals, each of said plurality of first optical signals having a corresponding one of a first plurality of wavelengths, said first optical transmitter being included in said plurality of first optical transmitters and said first optical signal being included in said plurality of first optical signals, said external modulator being configured to be modulated at a frequency substantially equal to a magnitude of a spectral spacing between adjacent ones of said first plurality of wavelengths.

14. An optical device in accordance with claim 1, further comprising a forward error correction encoder circuit coupled to said second transmitter, and a forward error correction decoder coupled to said receiver circuit.

15. An optical device in accordance with claim 1, wherein a modulation format associated with said second optical signal is optical CDMA.

16. An optical device in accordance with claim 1, wherein said filtering element is a first filtering element, said optical device further comprising:
 a second filtering element coupled to said first filtering element, said second filtering element has a first output configured to supply said second optical signal when said second optical signal having a first one of said plurality of second wavelengths, and a second output configured to supply said second optical signal when said second optical signal having a second one of said plurality of second wavelengths different than said first one.

17. An optical device in accordance with claim 16, wherein said second optical signal includes a plurality of pulses, each at a respective one of said plurality of wavelengths, further comprising:
 a first detector coupled to said first output of said second filtering element, said first detector generating a first sense signal in response to said second optical signal having said first one of said plurality of second wavelengths;
 a second detector coupled to said second output of said second filtering element, said second detector generating a second sense signal in response to said second optical signal having said second one of said plurality of second wavelengths different than said first one; and
 a counter circuit coupled to said first and second detectors, said counter circuit initiating a count of said plurality of pulses in response to said first sense signal, and assigning a respective one of said plurality of wavelengths to each count.

18. An optical device in accordance with claim 16, wherein said second filtering element includes a fiber Bragg grating.

19. An optical device, comprising:
 a first optical transmitter emitting a first optical signal having a first wavelength;
 a second optical transmitter emitting a second optical signal having a second wavelength different than said first wavelength, said second wavelength being variable among a plurality of second wavelengths;
 an optical combining element configured to combine said first and second optical signals onto a common optical communication path; and
 an optical filtering element coupled to said optical communication path, said optical filtering element having an associated transmission spectrum having a plurality of transmission peaks, each of which corresponding to a respective one of said plurality of second wavelengths.

20. An optical device in accordance with claim 19, wherein said optical filtering element is coupled to said optical combining element and said second optical transmitter.

21. An optical device in accordance with claim 19, wherein a modulation frequency associated with said second optical signal is greater than an optical frequency associated with said first optical signal, said optical device further comprising:
 a detector coupled to said optical communication path; and
 a low pass filter coupled to said detector.

22. An optical device in accordance with claim 8, the transmission spectrum of said optical filtering element having a plurality of transmission minimas substantially overlapping with the first plurality of wavelengths.

23. An apparatus for monitoring a wavelength division multiplexed optical transmission system having a plurality of data transmitters each transmitting a respective data signal at a distinct data wavelength over an optical communication path, comprising:
 a monitoring signal transmitter optically coupled to the optical communication path, said monitoring signal transmitter including a tunable laser generating a tunable monitoring wavelength carrying a monitor signal via modulation, wherein the monitoring wavelength is tunable among a plurality of monitoring wavelengths;
 an optical combiner combining the tunable monitoring wavelength and the distinct data wavelengths; and
 an optical filter optically coupled to said monitoring signal transmitter and to the optical communication path, said optical filter having a plurality of transmission maxima corresponding to the monitoring wavelengths and a plurality of transmission minima corresponding to the data wavelengths.

24. The apparatus in accordance with claim 23, wherein the data wavelengths and the monitoring wavelengths are mutually distinct wavelengths.

25. The apparatus in accordance with claim 23, wherein each of the monitoring wavelengths are between respective pairs of the data wavelengths.

26. The apparatus in accordance with claim 23, further comprising:
 a controller operatively connected to said monitoring signal transmitter, said controller generating control signals causing the tunable laser to change the monitoring wavelength in a step-wise fashion.

27. The apparatus in accordance with claim 26, wherein each of the monitoring wavelengths are substantially midway between respective pairs of the data wavelengths.

28. The apparatus in accordance with claim 27, wherein the step-wise changes to the monitoring wavelength have a channel-spacing step-size.

29. The apparatus in accordance with claim 23, further comprising:
 a second optical filter optically coupled to the optical communication path, said second optical filter having a plurality of transmission maxima corresponding to the monitoring wavelengths and a plurality of transmission minima corresponding to the data wavelengths; and
 a receiver circuit optically coupled to said second optical filter, said receiver circuit being configured to sense the monitor signal.

* * * * *